United States Patent [19]
Huey et al.

[11] Patent Number: 5,674,307
[45] Date of Patent: Oct. 7, 1997

[54] HOLLOW MINERAL FIBERS USING ROTARY PROCESS

[75] Inventors: Larry J. Huey, Granville; David C. K. Lin, Worthington, both of Ohio

[73] Assignee: Owens-Corning Fiberglas Technology, Inc., Summit, Ill.

[21] Appl. No.: 571,007

[22] Filed: Dec. 12, 1995

[51] Int. Cl.⁶ .................. C03B 37/075; C03B 37/04
[52] U.S. Cl. .................. 65/439; 65/459; 65/470; 65/494; 65/521; 264/8; 425/8; 425/DIG. 217
[58] Field of Search .................. 65/439, 494, 459, 65/469, 470, 521; 264/8; 425/8, DIG. 217

[56] References Cited

U.S. PATENT DOCUMENTS

| | | |
|---|---|---|
| 3,282,667 | 11/1966 | Stalego et al. . |
| 3,397,427 | 8/1968 | Burke, Jr. et al. ............... 65/439 X |
| 3,510,393 | 5/1970 | Burgman et al. ............... 65/439 X |
| 3,824,086 | 7/1974 | Perry et al. . |
| 4,246,017 | 1/1981 | Phillips . |
| 4,526,597 | 7/1985 | Olinger et al. . |
| 4,622,054 | 11/1986 | Huey et al. . |
| 4,758,259 | 7/1988 | Jensen . |
| 4,759,974 | 7/1988 | Barthe et al. ............... 65/455 X |
| 4,762,749 | 8/1988 | Schuetz . |
| 4,833,013 | 5/1989 | Schuetz . |
| 4,846,864 | 7/1989 | Huey . |
| 4,853,001 | 8/1989 | Hammel . |
| 4,889,546 | 12/1989 | Denniston ............... 65/464 |
| 4,917,715 | 4/1990 | Kaveh et al. . |
| 4,941,904 | 7/1990 | Barch et al. . |
| 4,948,409 | 8/1990 | Chenoweth et al. ............... 65/515 |
| 5,312,469 | 5/1994 | Houston . |
| 5,431,992 | 7/1995 | Houpt et al. . |
| 5,529,594 | 6/1996 | Wetmore et al. ............... 65/439 X |

FOREIGN PATENT DOCUMENTS

| | | |
|---|---|---|
| WO80/00695 | 4/1980 | WIPO . |
| WO95/12551 | 5/1995 | WIPO . |

*Primary Examiner*—Melvin Mayes
*Attorney, Agent, or Firm*—C. Michael Gegenheimer; Curtis B. Brueske

[57] ABSTRACT

In a method for producing hollow mineral fibers such as glass fibers, molten glass is supplied to a rotating glass spinner having a peripheral wall. The spinner rotates so that molten glass is centrifuged through a first tube positioned at least mostly inside the peripheral wall of the spinner in an orifice to form fibers. Gas is introduced into the interior of the molten glass to form hollow glass fibers. A second tube positioned inside the first tube includes an inlet in the wall of the first tube, wherein the orifice and first tube are adapted to allow gas to be introduced through the inlet from outside the peripheral wall. The hollow glass fibers are then collected to form a product such as a mat.

18 Claims, 8 Drawing Sheets

HOLLOW MINERAL FIBERS USING ROTARY PROCESS

SPECIFICATION

TO ALL WHOM IT MAY CONCERN:

Be it known that we, LARRY J. HUEY, resident of Granville, County of Licking, and DAVID C. K. LIN, resident of Worthington, County of Franklin, both of the State of Ohio, and both citizens of the United States, have invented a new and useful improvement in HOLLOW MINERAL FIBERS USING ROTARY PROCESS which invention is fully set forth in the following specification.

1. Technical Field

This invention relates to the manufacture of mineral fibers for such uses as insulating materials, reinforcements, and construction materials. With respect to this invention, mineral fibers means fibers of glass, rock, slag or basalt. More specifically, this invention relates to a method for manufacturing hollow glass fibers by a modified rotary process.

2. Background Art

The production of wool glass fibers by means of a rotary process is well known. In general, molten glass is fed into a spinner which revolves at high speeds. The spinner has a peripheral wall containing a multiplicity of orifices. Molten glass passed by centrifugal force through the orifices of the peripheral wall forms small diameter molten glass streams. Positioned circumferentially about the spinner is an annular blower for turning the fibers downwardly toward a collection surface.

The production of textile or continuous glass fibers by mechanically drawing molten streams of glass from orifices in the bottom wall of a bushing or feeder is also well known. It is also known to make hollow glass fibers using this textile process. U.S. Pat. No. 4,846,864 to Huey discloses a tip assembly for use in a bushing for the production of hollow glass fibers by a textile process. The hollow glass fibers have more surface area for the same amount of glass, and as a result they can provide more effective insulation products. The hollow glass fibers also are lighter in weight than solid glass fibers having the same length and diameter. Because they can often provide the same performance at reduced weight, hollow glass fibers are more useful in certain industrial applications such as reinforcing materials in composites.

Unfortunately, the textile process for making hollow glass fibers has a limited throughput overall, because the process relies solely on mechanical attenuation to form the molten glass into fibers. The textile process is also limited in its ability to make hollow glass fibers having a high void fraction, and to make small diameter fibers.

Therefore, it would be desirable to provide a process for making hollow glass fibers that overcomes the limitations of the textile process.

DISCLOSURE OF THE INVENTION

This invention relates to a method for producing hollow mineral fibers such as glass fibers. In the method, molten glass is supplied to a rotating glass spinner having a peripheral wall. The spinner rotates so that molten glass is centrifuged through a first tube positioned at least mostly inside the peripheral wall of the spinner in an orifice to form fibers. Gas is introduced into the interior of the molten glass to form hollow glass fibers. A second tube positioned inside the first tube includes an inlet in the wall of the first tube, wherein the orifice and first tube are adapted to allow gas to be introduced through the inlet from outside the peripheral wall. The hollow glass fibers are then collected as a product, such as a mat.

Advantageously, this rotary process for making hollow glass fibers has a higher throughput overall than a textile process. The rotary process achieves a high throughput by using centrifugal force to form fibers through the peripheral wall of the spinner. It is easier to make hollow glass fibers having a higher void fraction, and to make fibers having a small diameter, by use of the rotary process. The hollow glass fibers are reduced in weight between about 10% and about 80%, preferably between about 25% and about 50%, compared to solid glass fibers. The reduced weight fibers can be transported less expensively and handled more easily. The fibers provide excellent performance in a wide variety of applications.

In comparison with an insulation product of the same weight made from solid glass fibers, an insulation product made from the hollow glass fibers of this invention will have a greater fiber content, by up to twice or more, and in turn a larger fiber surface area. Increasing the fiber surface area lowers the thermal conductivity or k value of the insulation product. A lower k value means that the product conducts less heat and is thus a better insulator. Building insulation products are quantified by their ability to retard heat flow, typically measured as resistance to heat flow or R value. Because R value is inversely proportional to k value, a lower k value results in a higher R value. Thus, the present invention is expected to enable insulation products to be produced with greater insulating capabilities for the same cost as well as less expensive insulation products that perform the same, compared with insulation products made from solid glass fibers.

It was not apparent before this invention that hollow glass fibers could be made by a rotary process. Although it is known to manufacture solid glass fibers by a rotary process, the manufacture of hollow fibers is significantly different from the manufacture of solid fibers. Moreover, although it is known to manufacture hollow glass fibers by a textile process, the manufacture of glass fibers by a textile process is significantly different from their manufacture by a rotary process.

Various objects and advantages oft his invention will become apparent to those skilled in the art from the following detailed description of the preferred embodiment, when read in light of the accompanying drawings.

BEST MODE FOR CARRYING OUT THE INVENTION

Figure 1:
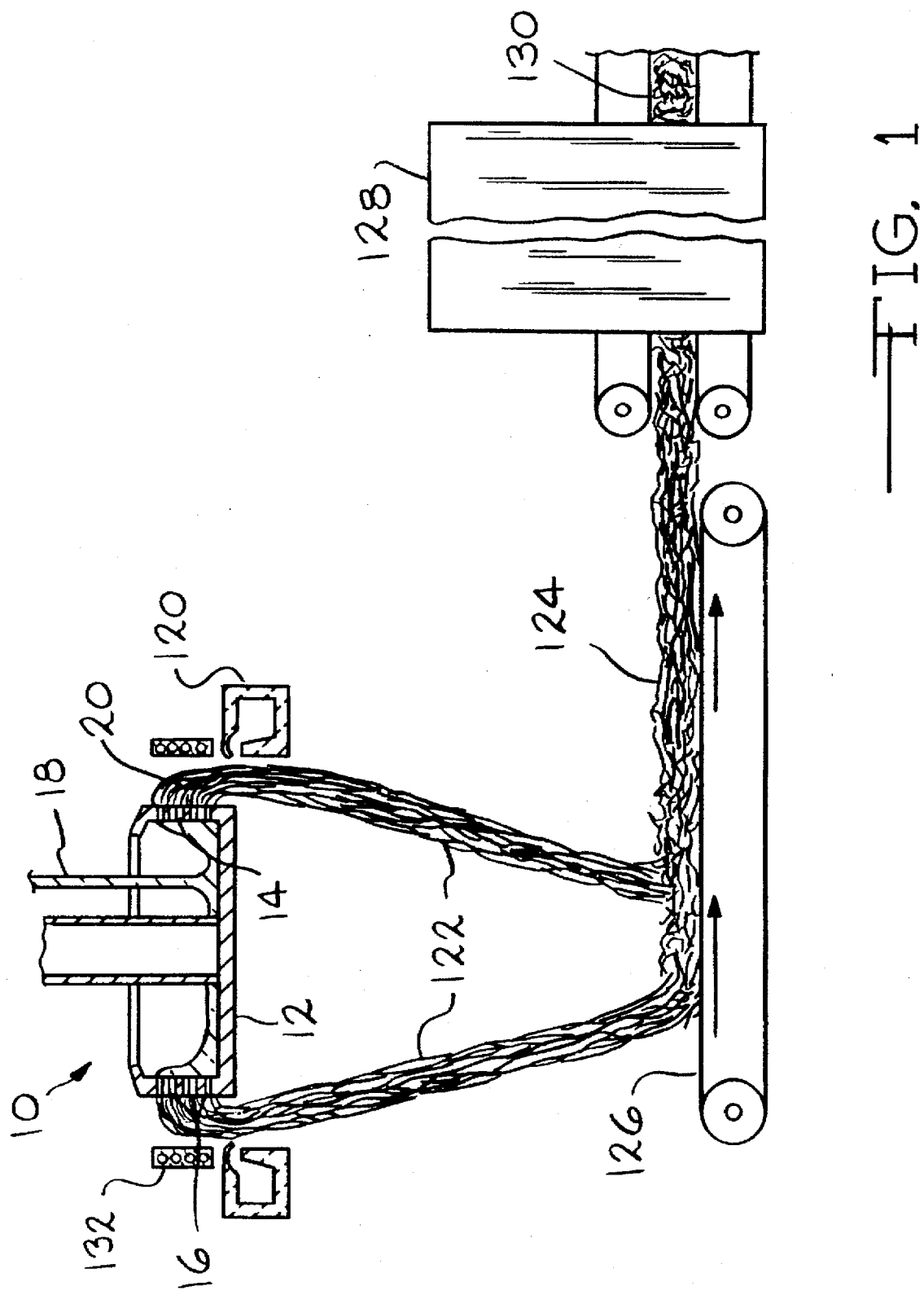
FIG. 1 is schematic sectional view in elevation of apparatus for centrifuging glass fibers in accordance with the rotary process of this invention.

As shown in FIG. 1, the apparatus for producing hollow glass fibers by a rotary process includes rotatably mounted glass spinner 10 which is comprised generally of a bottom wall 12 and a peripheral wall 14. The spinner can be cast from nickel/cobalt/chromium alloy or can be any other suitable spinner such as one from welded stainless steel. The peripheral wall 14 has between about 200 and about 25,000 orifices 16 for the centrifugation of glass fibers, preferably between about 200 and about 5,000 orifices, and more preferably between about 1,000 and about 3,000 orifices. The number of orifices is somewhat dependent upon the spinner diameter. The orifices can be formed in the peripheral wall by any method, such as laser drilling, electrical discharge milling, or electron beam drilling. As will be discussed below in relation to FIG. 2 but not shown in FIG. 1, tip assemblies 22 are located in the orifices 16.

Molten glass is dropped into the rotating spinner 10 as feed stream 18. Alternatively the molten glass can be fed to the spinner through pipes or other delivery conduits. The molten glass can be produced or supplied by any method well known to persons skilled in the art, such as by use of a furnace and forehearth. Preferably the glass composition comprises by weight percent from about 50% to about 61% silica or $SiO_2$, from about 0% to about 7% alumina or $Al_2O_3$, from about 9% to about 13% lime or CaO, from about 0% to about 5% magnesia or MgO, from about 14% to about 24% borate or $B_2O_3$, from about 0% to about 10% soda or $Na_2O$, and from about 0% to about 2% potassium oxide or $K_2O$. While temperature conditions vary, generally the temperature of the molten glass within the spinner is from about 1500° F. (816° C.) to about 2400° F. (1316° C.), and typically is about 1900° F. (1038° C.).

Upon reaching the spinner bottom wall 12, the molten glass is driven radially outwardly and up the peripheral wall 14 where centrifugal force centrifuges the glass through the tip assemblies 22 located in the orifices 16 to form a plurality of hollow glass fibers 20. The spinner 10 typically rotates at a speed from about 1200 rpm to about 3000 rpm, and preferably from about 1500 rpm to about 2000 rpm. Spinners of various diameters can be used, and the rotation rates can be adjusted to give the desired radial acceleration at the inner surface of the peripheral wall of the spinner. The spinner diameter is typically from about 8 inches (20.3 cm) to about 40 inches (101.6 cm), preferably from about 10 inches (25.4 cm) to about 25 inches (63.5 cm), and most preferably about 15 inches (38.1 cm). The radial acceleration (velocity$^2$/radius) of the inner surface of the peripheral wall of the spinner is from about 15,000 feet/second$^2$ (4,572 meters/second$^2$) to about 45,000 feet/second$^2$ (13,716 meters/second$^2$) and preferably from about 20,000 feet/second$^2$ (6,096 meters/second$^2$) to about 30,000 feet/second$^2$ (9,144 meters/second$^2$).

Figure 2:
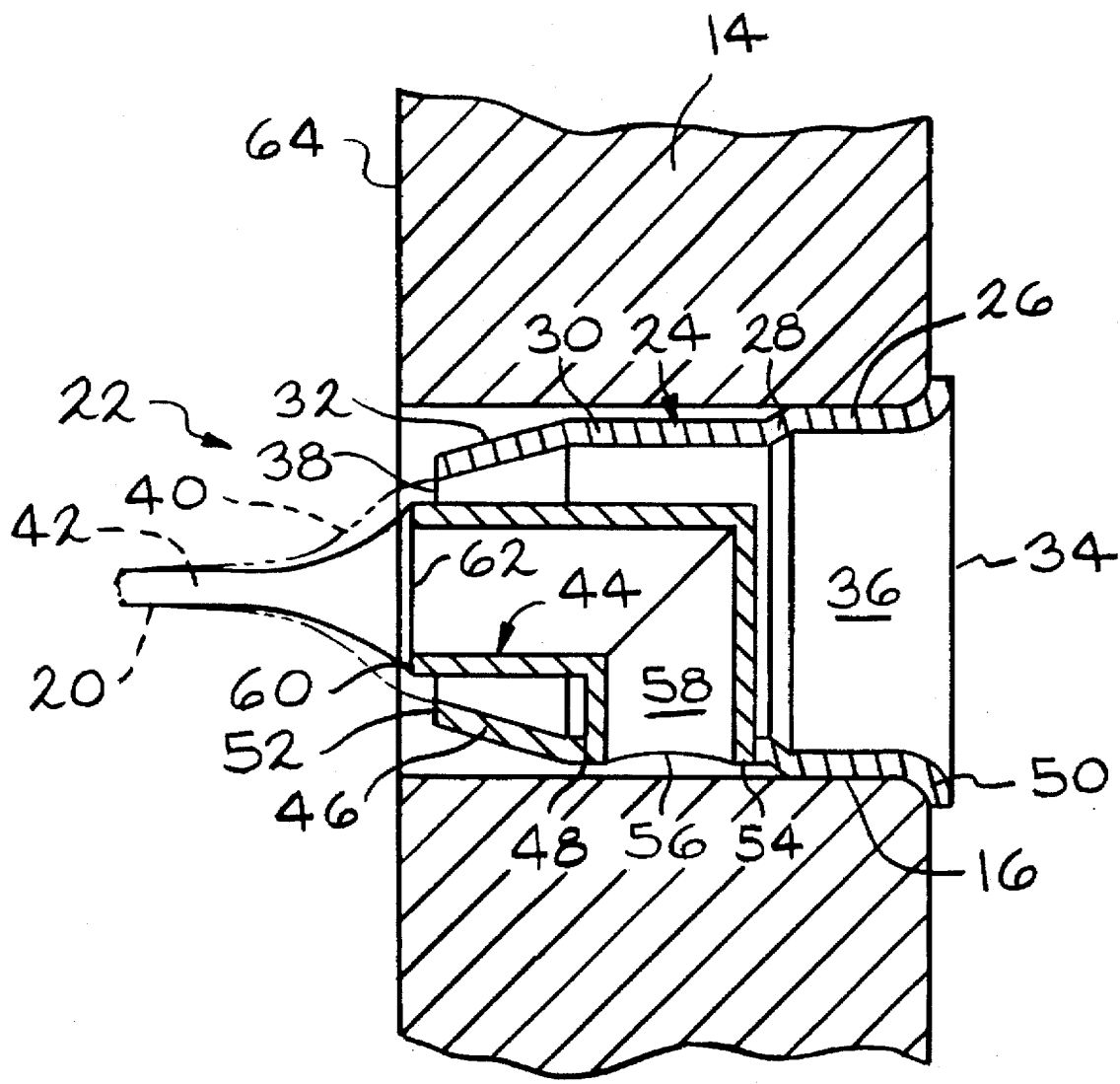
FIG. 2 is an enlarged cross-sectional view of a tip assembly located in the peripheral wall of a glass spinner in accordance with this invention.

FIG. 2 illustrates a preferred embodiment of a tip assembly 22 in accordance with this invention. The tip assembly 22 is located in an orifice 16 in the peripheral wall 14 of the spinner, and preferably fits at least mostly inside the peripheral wall, i.e., in the direction of the thickness of the peripheral wall. The tip assembly 22 of FIG. 2 fits entirely within the peripheral wall. In operation, a tip assembly 22 is located in each orifice 16 of the spinner, although hollow fibers could be made in conjunction with solid fibers from conventional orifices. Each tip assembly 22 includes a generally cylindrical first tube 24. The first tube 24 has a bottleneck design which includes a wide portion 26, a necked down portion 28, a narrowed portion 30 and a tapering portion 32. The wide portion 26 of the first tube 24 has an outer diameter substantially the same as the diameter of the orifice 16. The wide portion 26 can be secured to the orifice 16 by any suitable method, such as welding or brazing. The first tube 24 further includes an inlet 34, a bore 36, and an outlet 38. Molten glass is centrifuged through the first tube 24 to form fibers 20. The molten glass flows from inside the spinner into the inlet 34, then through the bore 36, and then exits through the outlet 38. Preferably the molten glass exiting the first tube 24 is reduced in diameter in a fiber forming cone 40 to form fibers 20. The cone 40 is formed where the molten glass necks down from the diameter of outlet 38 of the first tube 24 to a smaller diameter.

Each tip assembly 22 is adapted to move or draw the gas immediately surrounding the tip assembly, and introduce it into the interior of the molten glass. Preferably the gas is ambient air. However, the gas can also be nitrogen, argon, combustion gases, or other suitable gases. By introducing gas into the interior of the molten glass, continuous voids 42 are produced inside the glass fibers to form hollow glass fibers 20. Preferably the gas is introduced into the cone 40.

In the preferred embodiment shown in FIG. 2, the gas is introduced into the interior of the molten glass through a second tube 44. Preferably, as shown in FIG. 2, the second tube 44 is positioned inside the first tube 24 the peripheral wall 14 of the spinner. The illustrated second tube 44 is generally "L" shaped, but it can be any shape suitable for the sufficient flow of gas to form the voids 42 in the fibers. In particular, first tube 24 includes a sleeve 46 having an aperture 48 located intermediate shoulder 50 and distal end 52. First end 54 of second tube 44 is attached to sleeve 46 at aperture 48. The aperture 48 is positioned in the narrowed portion 30 of the first tube 24. Thus, inlet 56 of passageway 58 of second tube 44 is in communication with the region immediately adjacent to the exterior of first tube 24. Preferably the outside diameter of the narrowed portion 30 of the first tube 24 is at least about 0.010 inch (0.025 cm) less than the diameter of the orifice 16. Distal end 60 of second tube 44, and thus outlet 62 of passageway 58, is located near the distal end 52 of first tube 24. In the illustrated embodiment, outlet 62 is located slightly outside the distal end 52, but the outlet 62 can also be located even with or slightly inside the distal end 52.

As a result of the above-described structure, the inlet 56 of the second tube 44 is open to ambient gas pressure immediately surrounding the tip assembly 22, outside the peripheral wall of the spinner. The bottleneck design of the first tube 24 provides a passage for gas to reach the inlet 56. The outlet 62 of the second tube 44 is located near the outlet 38 of the first tube 24. As the molten glass flows through the annulus formed between first tube 24 and second tube 44, gas in the forming region or zone is aspirated through passageway 58 of second tube 44 into the cone 40 being attenuated into a fiber 20, thereby forming a hollow glass fiber 20. The fiber is generally circular in radial cross section because the bore 36 of the first tube 24 has a circular radial cross section.

In FIG. 2, the outlet 62 of second tube 44 is generally concentric with the outlet 38 of first tube 24. This produces a hollow glass fiber having a generally centrally located continuous void. It is to be understood, however, that other orientations are acceptable. A variation includes having a non-concentric alignment between the outlets 51 and 30. In addition to having a non-concentric alignment, bore 36 of first tube 24 may have a non-circular radial cross section to enable the formation of non-circular fibers, or second tube 44 may have a non-circular radial cross section to enable the formation of non-circular voids. The tubes can have any number of shapes and orientations. In addition, the tubes can be any type of conduit suitable for the flow of gas and molten glass.

In the system shown in FIG. 2, the gas is drawn into the interior of the cone 40 by the fact that the internal pressure of the molten glass at that location is subatmospheric due to, among other things, the attenuation of the cone 40 into a fiber 20. That is, no outside source of pressurized gas is needed to produce the hollow configuration. However, it is to be understood that the present invention can be adapted to be utilized in conjunction with a pressurized system, as disclosed in U.S. Pat. No. 4,846,864 to Huey, issued Jul. 11, 1989 (incorporated by reference herein).

The hollow nature of the hollow glass fibers may be quantified in terms of their void fraction, which is defined as $(D_i/D_o)^2$, where $D_i$ is the inside diameter and $D_o$ is the outside diameter of the fiber. The void fraction of the hollow glass fibers is dependent on the pressure of the gas and the tip assembly design, particularly the inside diameter of the second tube 44 at the outlet 62. The average void fraction of the hollow glass fibers can be varied from very small (about 10%) to very large (about 80%). Preferably the average void fraction is from about 40% to about 60%, and most preferably from about 40% to about 45%. The average void fraction is usually higher than the void fraction obtained using a textile process as described in the above-mentioned U.S. Pat. No. 4,846,864 to Huey. This desirably higher void fraction is thought to result from the large body forces in the rotary process. Even though the glass fibers in accordance with the invention have been called "hollow", they can include some parts along the length of the fibers that are solid and will still be considered hollow.

The void fraction of the hollow glass fibers is also affected by the position of the distal end 52 of the first tube 24 relative to the outer surface 64 of the peripheral wall 14, and by the position of the distal end 60 of the second tube 44 relative to the distal end 52 of the first tube 24. In general, protrusion of the distal end 52 relative to the outer surface 64 increases void fraction, while retraction of the distal end 52 relative to the outer surface 64 decreases void fraction. The distal end 52 is preferably positioned somewhere in the region ranging from within the outer surface 64 a distance equal to about twice the outside diameter of the first tube 24 at the distal end 52, to beyond the outer surface 64 a distance equal to about twice the outside diameter of the first tube 24 at the distal end 52.

Similarly, protrusion of the distal end 60 of the second tube 44 relative to the distal end 52 of the first tube 24 increases void fraction, while retraction of the distal end 60 relative to the distal end 52 decreases void fraction. The distal end 60 is preferably positioned somewhere in the region ranging from within the distal end 52 a distance equal to about twice the outside diameter of the second tube 44 at the distal end 60, to beyond the distal end 52 a distance equal to about twice the outside diameter of the second tube 44 at the distal end 60.

Figure 3:
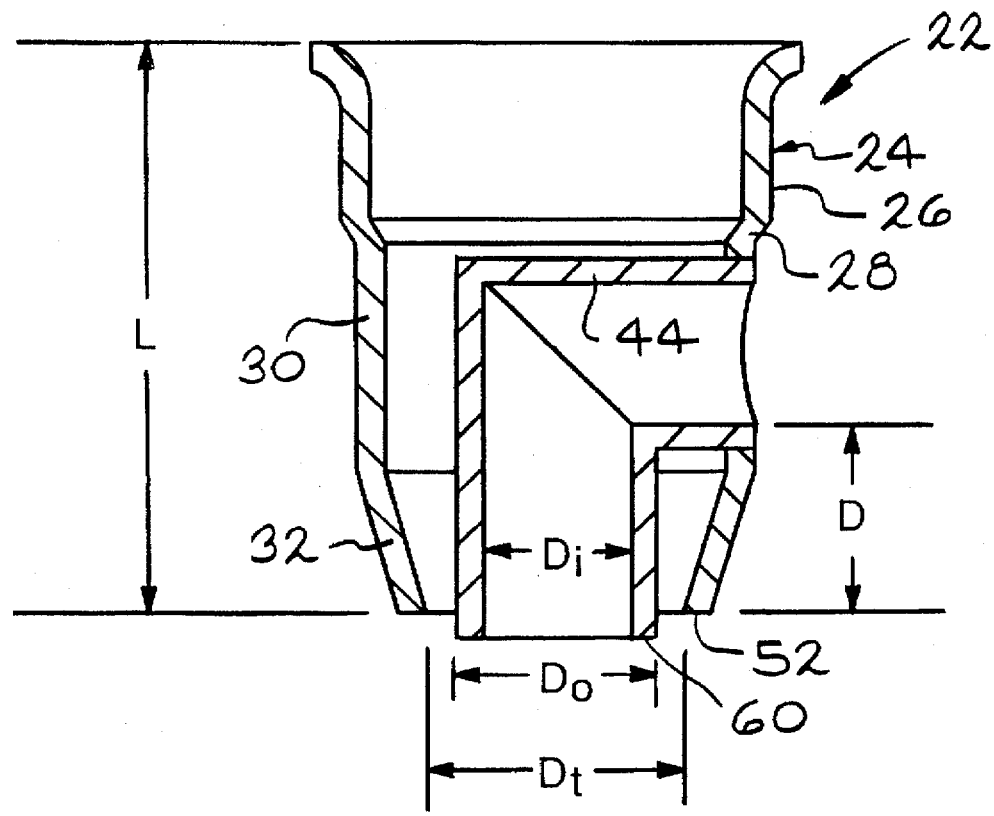
FIG. 3 is an enlarged cross-sectional view of the tip assembly of FIG. 2 showing its dimensions.
Figure 4:
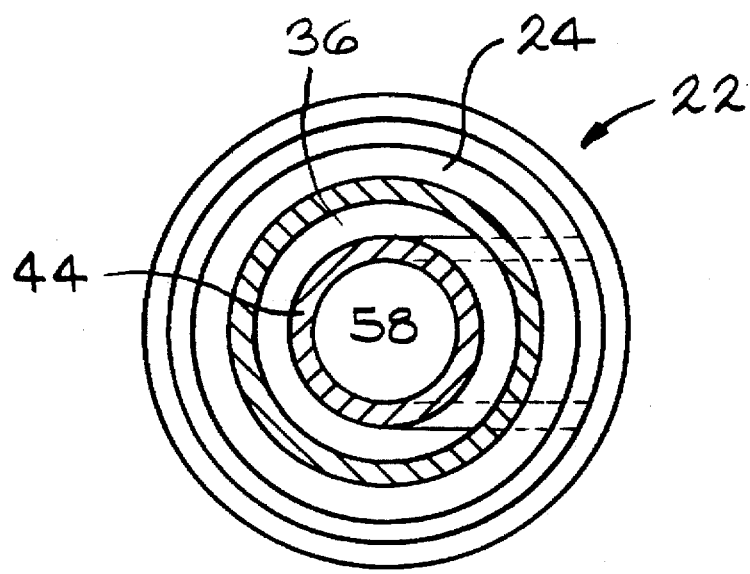
FIG. 4 shows the tip assembly of FIG. 2 as viewed from outside the peripheral wall of the spinner.

The tip assembly 22 of FIG. 2 is further illustrated in FIGS. 3 and 4. It has been found that the tip assembly 22 for making hollow glass fibers by the rotary process of this invention must be significantly smaller than a tip assembly for making hollow glass fibers by a textile process such as disclosed in U.S. Pat. No. 4,846,864 to Huey, issued Jul. 11, 1989. The tip assembly 22 includes a first tube 24 and a second tube 44. The overall length L of the first tube 24 is preferably from about 0.050 inch (0.127 cm) to about 0.300 inch (0.762 cm). The first tube 24 includes a wide portion 26, a necked down portion 28, a narrowed portion 30, and a tapering portion 32. The inside diameter $D_t$ of the tapering portion 32 at the distal end 52 is preferably from about 0.040 inch (0.102 cm) to about 0.150 inch (0.381 cm). Preferably the second tube 44 has an outside diameter $D_o$ at its distal end 60 from about 0.020 inch (0.051 cm) to about 0.140 inch (0.356 cm), and an inside diameter $D_i$ at its distal end 60 from about 0.015 inch (0.038 cm) to about 0.120 inch (0.305 cm).

Distal end 60 of second tube 44 is preferably positioned somewhere in the region ranging from within the distal end 52 of first tube 24 a distance equal to about twice the outside diameter $D_o$ of the second tube 44, to beyond distal end 52 of first tube 24 a distance equal to about twice the outside diameter $D_o$ of the second tube 44. More preferably, distal end 60 of second tube 44 is either about flush with distal end 52 of first tube 24 or extending therefrom up to and including a distance equal to about the outside diameter $D_o$ of the second tube 44.

Preferably the inlet 56 of the second tube 44 is positioned away from the distal end 52 of the first tube 24, a distance D at least as great as the inside diameter $D_i$ of the second tube 44 at the outlet 62. This positioning ensures an optimum flow of gas into the hollow fibers.

FIG. 4 illustrates the tip assembly 22 viewed from outside the peripheral wall of the spinner. It can be seen that the tip assembly 22 includes a first tube 24 and a second tube 44 positioned inside the first tube. The first tube 24 includes a bore 36 for the flow of molten glass. The second tube 44 includes a passageway 58 for the flow of gas.

Figure 5:
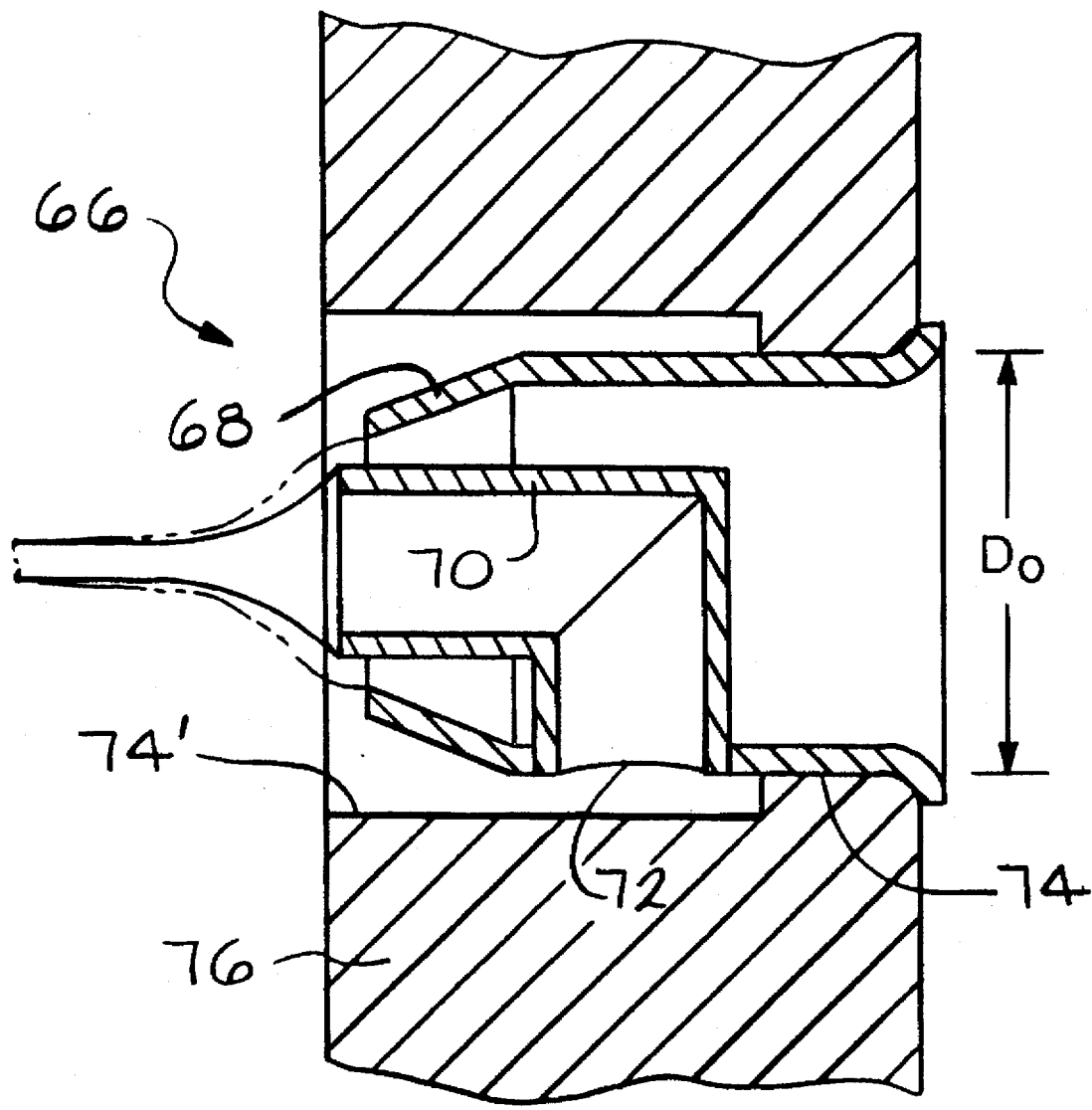
FIG. 5 is an enlarged cross-sectional view of a second embodiment of a tip assembly in accordance with this invention.

FIG. 5 illustrates a second embodiment of a tip assembly in accordance with this invention. The tip assembly 66 includes a first tube 68 and a second tube 70 similar in structure to those of the first embodiment. Unlike the first embodiment, however, the first tube 68 does not include a necked down portion to allow the passage of gas to the inlet 72 of the second tube 70. Rather, the orifice 74 includes a larger diameter portion 74' extending inward from the outer surface of the peripheral wall 76, and the inlet 72 is positioned inside the larger diameter portion. This allows the passage of gas to the inlet 72. Preferably the diameter of the larger diameter portion 74' is at least about 0.010 inch (0.025 cm) greater than the outside diameter $D_o$ of the first tube 68.

Figure 6:
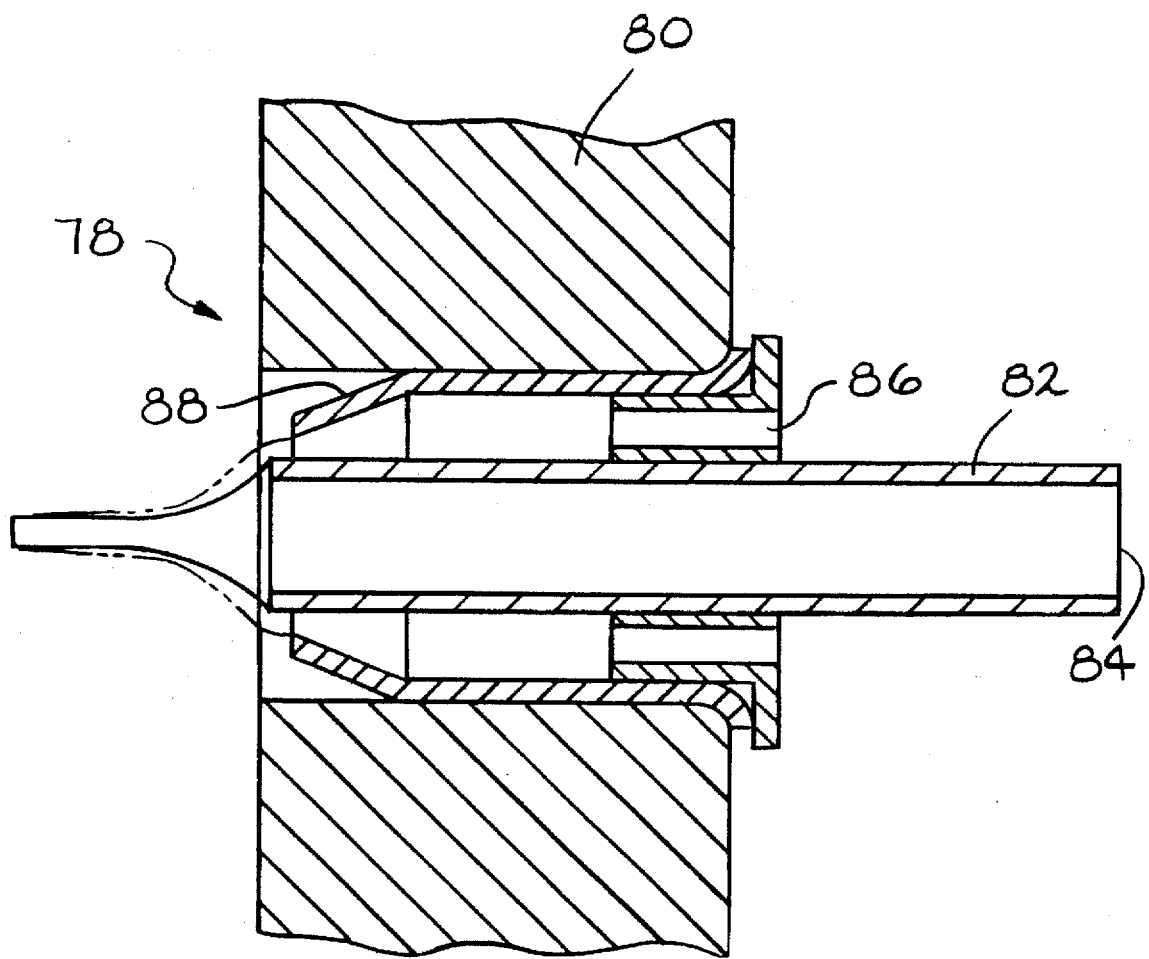
FIG. 6 is an enlarged cross-sectional view of a third embodiment of a tip assembly in accordance with this invention.

The tip assembly 22 shown in FIG. 2 draws gas from outside the peripheral wall 14 of the spinner. However, the invention is not limited thereto. FIG. 6 shows a tip assembly 78 that draws gas from inside the peripheral wall 80 of the spinner. The second tube 82 extends inside the peripheral wall 80 a sufficient distance to be inside the molten glass being centrifuged through the peripheral wall. In this manner, gas can be introduced into the inlet 84 of the second tube 82 from inside the spinner. A sleeve 86 mounted to the second tube 82 centers it within, and attaches it to, the first tube 88. The sleeve 86 is perforated to allow molten glass to flow into the first tube 88. The sleeve 86 can be a continuous body, or it can be composed of discrete circular segments with molten glass passing between the segments.

Figure 7:
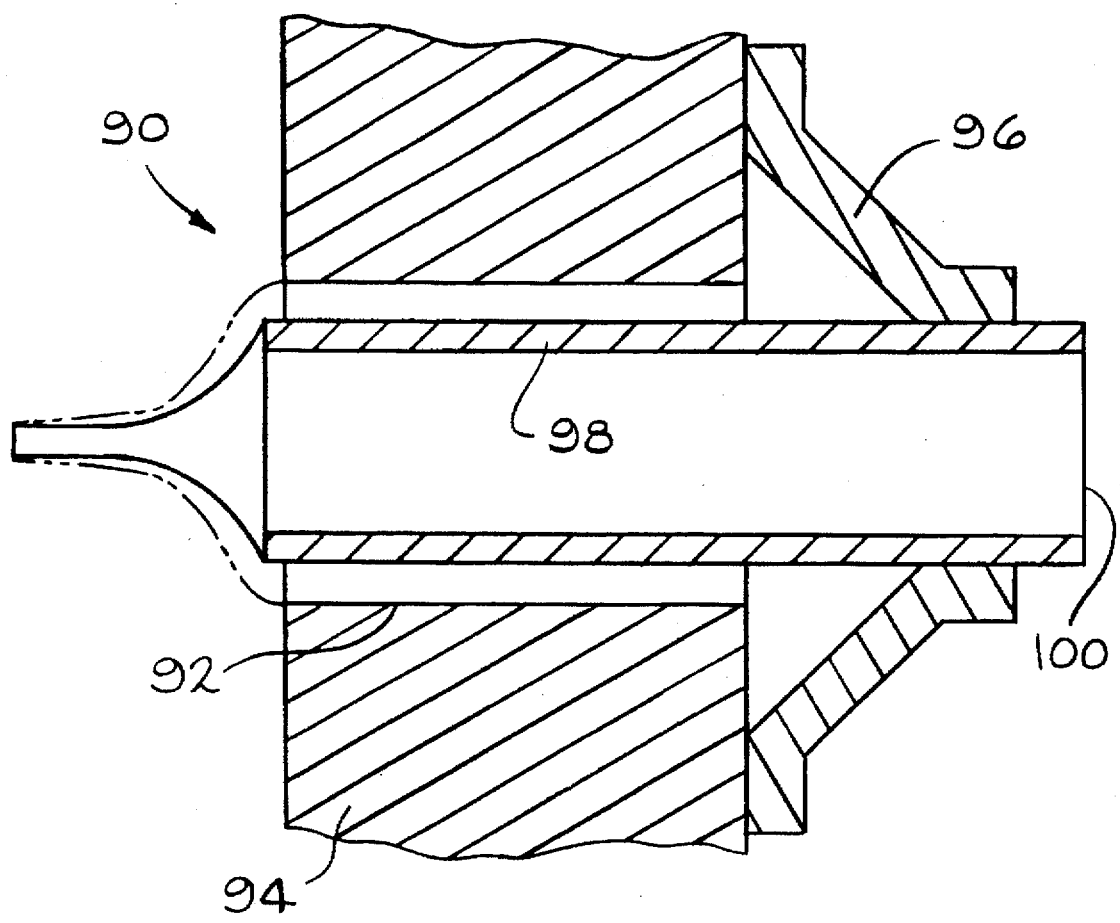
FIG. 7 is an enlarged cross-sectional view of a fourth embodiment of a tip assembly in accordance with this invention.
Figure 8:
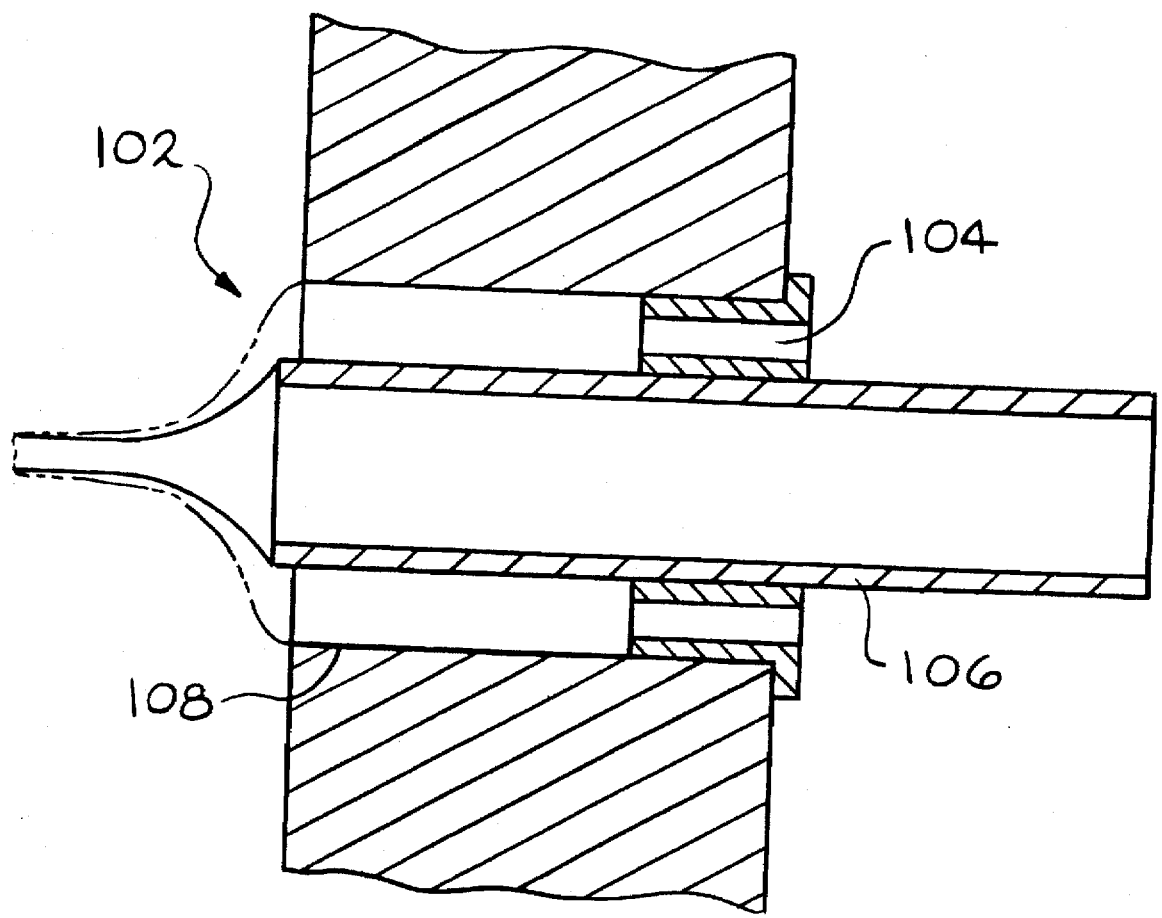
FIG. 8 is an enlarged cross-sectional view of a fifth embodiment of a tip assembly in accordance with this invention.

In the tip assembly 22 shown in FIG. 2, the first tube 24 has been illustrated as a separate structure. However, FIG. 7 shows a lip assembly 90 where the orifice 92 in the peripheral wall 94 of the spinner comprises the first tube. The first tube is not a separate structure apart from the orifice 92. A "spider" 96 or other support structure is used to attach the second tube 98 to the peripheral wall 94. This embodiment also shows gas being introduced through an inlet 100 of the second tube 98 from inside the spinner. FIG. 8 shows a similar lip assembly 102 where a sleeve 104 is used to center and attach the second tube 106 within the orifice 108.

Figure 9:
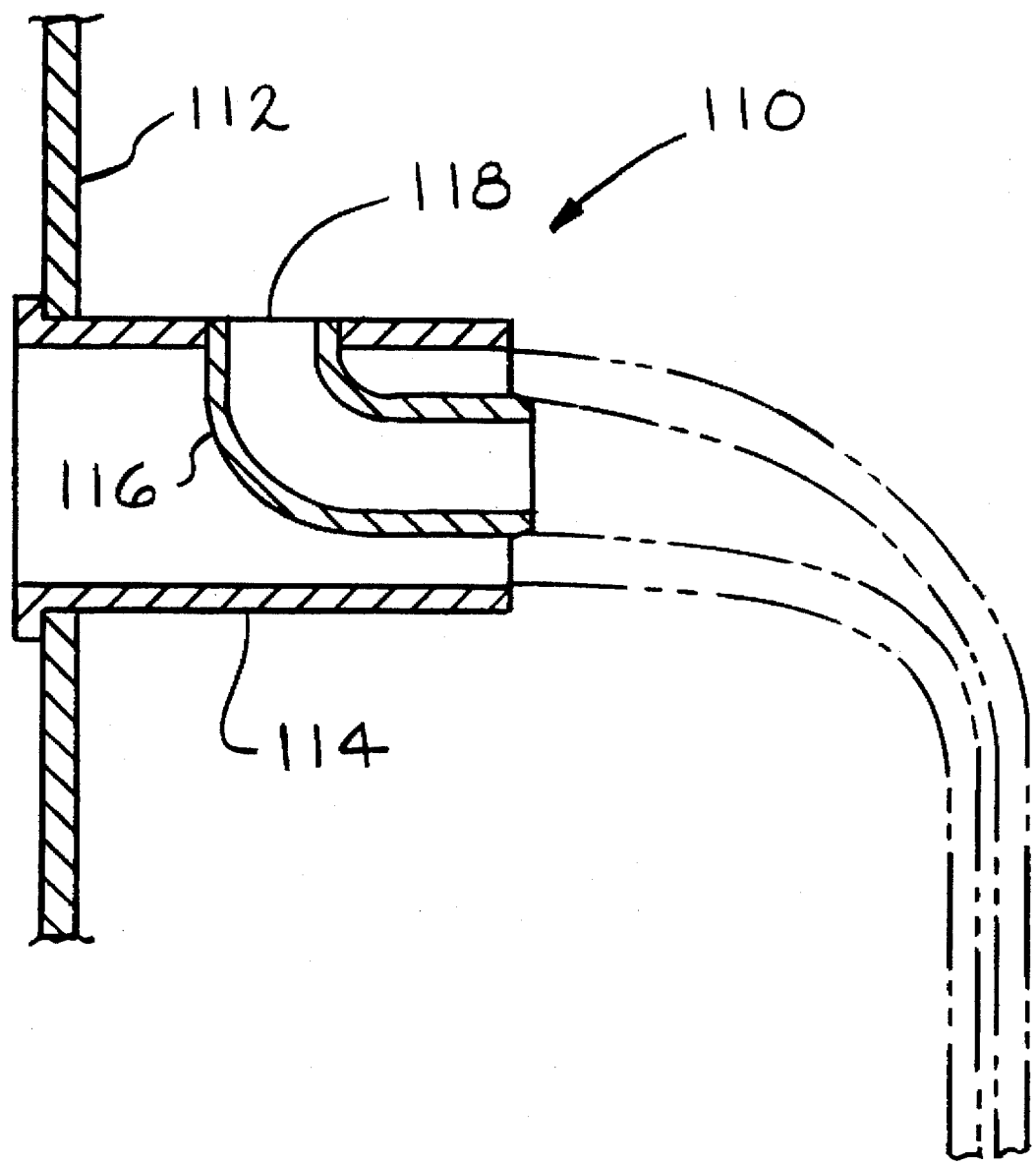
FIG. 9 is an enlarged cross-sectional view of a sixth embodiment of a tip assembly in accordance with this invention.

FIG. 9 shows a tip assembly 110 that extends mostly outside the peripheral wall 112 of the spinner instead of being positioned mostly inside the peripheral wall. The first tube 114 extends from the peripheral wall 112. The second tube 116 is positioned inside the first tube 114. The inlet 118 of the second tube 116 is positioned outside the peripheral wall 112 so that gas can flow freely into the inlet as the spinner rotates. In the tip assembly 110 of FIG. 9, the inlet 118 of the second tube 116 is oriented generally in the upward direction. However, a benefit of the rotary process when the tip assembly 110 extends mostly outside the peripheral wall 112 of the spinner is that the pressure of gas flowing through the inlet 118 can be adjusted by changing the position of the inlet. If the inlet 118 is oriented generally in the forward direction (the direction of rotation of the spinner), gas is forced through the inlet to increase the gas pressure. The mount of void in the hollow glass fibers can be increased by increasing the pressure of the gas introduced into their interior.

Other suitable configurations for the first and second tubes are disclosed in the above-cited U.S. Pat. No. 4,846,864 to Huey. The Huey patent also discloses "tipless" designs which, as disclosed above, are an alternative embodiment for forming the hollow glass fibers. It is to be understood that the spinner/tip assemblies of the present invention can be utilized to form discontinuous as well as the continuous fibers if desired.

Referring again to FIG. 1, after emanating from the tip assemblies 22 of the spinner 10, the hollow glass fibers 20 are directed downwardly by annular blower 120 to form a downwardly moving flow or veil 122 of hollow glass fibers. Any means can be used for turning the fibers from a generally radially outward path to a path directed toward a collection surface. The hollow glass fibers 20 are collected as hollow glass fiber web 124 on any suitable collection surface, such as conveyor 126.

Centrifugal attenuation by the rotation of the spinner is sufficient to produce hollow glass fibers of the desired fiber diameter. Preferably the hollow glass fibers have an average outside diameter from about 10 one-hundred thousandths of an inch (2.5 microns) to about 500 one-hundred thousandths of an inch (125 microns), more preferably from about 15 one-hundred thousandths of an inch (3.75 microns) to about 250 one-hundred thousandths of an inch (62.5 microns), and most preferably from about 15 one-hundred thousandths of an inch (3.75 microns) to about 150 one-hundred thousandths of an inch (37.5 microns). If desired, the annular blower 120 can be supplied with sufficient gas pressure to pull the hollow glass fibers and further attenuate them into the desired final hollow glass fiber diameter.

Subsequent to the hollow glass fiber forming step, the hollow glass fiber web 124 can be transported through any further processing steps, such as oven 128, to result in the final hollow glass fiber product, such as mat 130. Further processing steps could also include laminating the hollow glass fiber mat or layer with a reinforcement layer, such as a glass fiber mat.

An optional feature of the invention is the use of a heating means, such as induction heater 132 or an electric resistance heater, to heat either the spinner 10, or the hollow glass fibers 20, or both, to facilitate the hollow glass fiber attenuation, or to maintain the temperature of the spinner at the level for optimum centrifugation of the glass into hollow fibers.

EXAMPLE

Molten glass was supplied to a 15 inch (38.1 cm) glass spinner at a temperature of about 1700° F. (927° C.). The glass spinner was rotated so as to provide a radial acceleration of 36,000 feet/second$^2$ (10,973 meters/second$^2$). The spinner peripheral wall was adapted with 4 orifices (between about 1,000 and about 3,000 orifices would be preferred). Tip assemblies as shown in FIG. 2 were located in the orifices. The length of the first tube 24 of the tip assembly was 0.240 inch (0.610 cm), and it had an inside diameter of 0.116 inch (0.295 cm) at its outlet 38. The outside diameter of the second tube 44 at its outlet 62 was 0.080 inch (0.203 cm). (In general, a tip assembly used for making hollow glass fibers by a rotary process will be larger than a tip assembly used for making hollow polymer fibers by the same process). Glass depth in the spinner was about ¼ inch (0.635 cm). There was no external heating from an induction heater, and no secondary attenuation from an annular blower. The hollow glass fibers were collected as a mat. More than 90% of the fibers produced were hollow. The hollow glass fibers had an average void fraction of 60%. The average outside diameter of the fibers was 400 one-hundred thousandths of an inch (100 microns).

In accordance with the provisions of the patent statutes, the principle and mode of operation of this invention have been explained and illustrated Oin its preferred embodiment. However, it must be understood that this invention may be practiced otherwise than as specifically explained and illustrated without departing from its spirit or scope.

INDUSTRIAL APPLICABILITY

The invention can be useful in the manufacturing of glass and other mineral fibers for use in reinforcement products and insulation products.

We claim:

1. A method for producing hollow mineral fibers, comprising:

supplying molten mineral to a rotating spinner having a peripheral wall;

centrifuging the molten mineral through a first tube positioned at least mostly inside the peripheral wall of the spinner in an orifice to form fibers;

introducing gas into the interior of the molten mineral to form hollow mineral fibers, wherein a second tube positioned inside the first tube includes an inlet positioned inside the peripheral wall of the spinner in the wall of the first tube, and wherein the orifice and the first tube together are adapted to allow a flow of gas to be introduced through the inlet from outside the peripheral wall of the spinner; and collecting the hollow mineral fibers.

2. A method according to claim 1 wherein the first tube includes an outlet, and the first tube has a small diameter portion extending inward from the outlet, and wherein the inlet of the second tube is positioned in the small diameter portion of the first tube.

3. A method according to claim 2 wherein the outside diameter of the small diameter portion of the first robe is at least about 0.010 inch (0.025 cm) less than the diameter of the orifice.

4. A method according to claim 1 wherein the orifice includes a large diameter portion extending inward from the outer surface of the peripheral wall, wherein the diameter of the large diameter portion is greater than the outside diameter of the first tube, and wherein the inlet of the second tube is positioned inside the large diameter portion.

5. A method according to claim 4 wherein the diameter of the large diameter portion of the orifice is at least about 0.010 inch (0.025 cm) greater than the outside diameter of the first tube.

6. A method according to claim 1 wherein the second tube includes an outlet, and wherein the inside diameter of the second tube at the outlet is from about 0.015 inch (0.038 cm) to about 0.120 inch (0.305 cm).

7. A method according to claim 1 wherein the first tube includes an outlet, and wherein the inside diameter of the first tube at the outlet is from about 0.040 inch (0.102 cm) to about 0.150 inch (0.381 cm).

8. A method according to claim 1 wherein between about 200 and about 5,000 first tubes extend through the peripheral wall of the spinner.

9. A method according to claim 1 wherein the radial acceleration of the inner surface of the peripheral wall of the spinner is between about 15,000 feet/second$^2$ (4,572 meters/second$^2$) and about 45,000 feet/second$^2$ (13,716 meters/second$^2$).

10. A method according to claim 1 wherein the spinner rotates at a speed between about 1200 rpm and about 3000 rpm.

11. A method according to claim 1 wherein the first tube and the second tube each include an outlet, and wherein the outlet of the second tube is generally concentric with the outlet of the first tube.

12. A method according to claim 1 wherein the hollow mineral fibers have an average outside diameter from about 15 one-hundred thousandths of an inch (3.75 microns) to about 250 one-hundred thousandths of an inch (62.5 microns).

13. A method according to claim 1 wherein the average void fraction of the hollow mineral fibers is between about 40% and about 60%.

14. A method according to claim 1 wherein the mineral fibers are glass fibers.

15. A method for producing hollow glass fibers comprising:

supplying molten glass to a rotating glass spinner having a peripheral wall, wherein the radial acceleration of the inner surface of the peripheral wall of the spinner is between about 20,000 feet/second$^2$ (6,096 meters/second$^2$) and about 30,000 feet/second$^2$ (9,144 meters/second$^2$), centrifuging the molten glass through a first tube extending through the peripheral wall of the spinner, wherein the first tube is positioned mostly inside the peripheral wall of the spinner in an orifice;

introducing gas into the interior of the molten glass to form hollow glass fibers, wherein a second tube positioned inside the first tube includes an inlet positioned in the wall of the first tube inside the peripheral wall of the spinner, and wherein gas is introduced through the inlet from outside the peripheral wall of the spinner, the orifice and the first robe together being adapted to allow the flow of gas to the inlet; and collecting the hollow glass fibers.

16. An apparatus for making hollow fibers from molten material, the apparatus including a spinner having a peripheral wall having from about 200 to about 25,000 orifices, wherein first tubes positioned in the orifices extend through the peripheral wall, wherein second tubes positioned inside the first tubes each include an inlet positioned in the wall of the first robe for the introduction of gas, wherein the first robe is positioned mostly inside the peripheral wall and the inlet of the second tube is positioned inside the peripheral wall, and wherein the orifice and the first robe together are adapted to allow the flow of gas to the inlet.

17. An apparatus according to claim 16 wherein the first robe includes an outlet, and the first tube has a smaller diameter portion extending inward from the outlet, and wherein the inlet of the second tube is positioned in the small diameter portion of the first tube.

18. An apparatus according to claim 16 wherein the orifice includes a large diameter portion extending inward from the outer surface of the peripheral wall, wherein the diameter of the larger diameter portion is greater than the outside diameter of the first robe, and wherein the inlet of the second tube is positioned inside the larger diameter portion.

* * * * *

UNITED STATES PATENT AND TRADEMARK OFFICE
CERTIFICATE OF CORRECTION

PATENT NO. : 5,674,307

DATED : October 7, 1997

INVENTOR(S) : Larry J. Huey, David C.K. Lin

It is certified that error appears in the above-identified patent and that said Letters Patent is hereby corrected as shown below:

In Claim 3, line 2, "robe" should be - -tube- -.

In Claim 16, line 7, "robe" should be - -tube- -.

In Claim 16, line 8, "robe" should be - -tube- -.

In Claim 16, line 10, "robe" should be - -tube- -.

In Claim 17, line 2, "robe" should be - -tube- -.

In Claim 17, line 2, "smaller" should be - - small- -.

In Claim 18, line 4, "larger" should be - -large- -.

In Claim 18, line 5, "robe" should be - -tube- -.

In Claim 18, line 6, "larger" should be - -large- -.

Signed and Sealed this

Twenty-eighth Day of April, 1998

Attest:

BRUCE LEHMAN

Attesting Officer

Commissioner of Patents and Trademarks